Patented Mar. 22, 1938

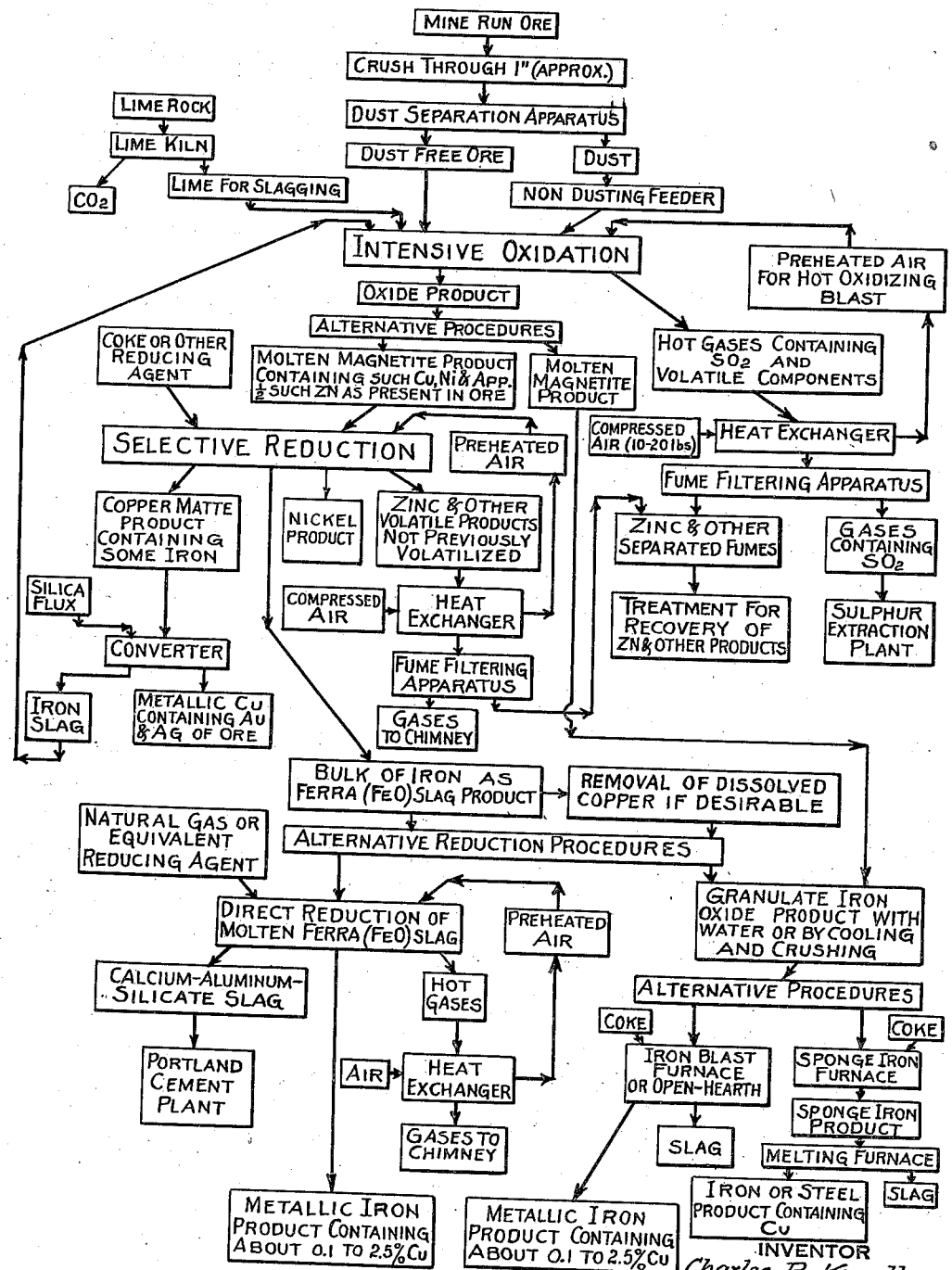

2,111,789

UNITED STATES PATENT OFFICE 2,111,789

TREATMENT OF SULPHIDE ORES

Charles R. Kuzell, Clarkdale, Ariz., assignor to Phelps Dodge Corporation, New York, N. Y., a corporation of New York Application October 15, 1934, Serial No. 748,374

30 Claims. (Cl. 75—21)

This invention relates to metallurgy and has for an object the provision of an improved method of treating ores, concentrates and other mineral and metallurgical products containing iron sulphide. More particularly, the invention contemplates the provision of an improved process for recovering iron from iron sulphide-bearing materials. The invention further contemplates the provision of an improved method of treating ores and other iron sulphide-bearing materials for the recovery of practically all of the metals and metalloids therein in the form of marketable products. A further object of the invention is to provide an improved method for producing a metallic iron product containing one or more alloying elements such as copper and nickel.

Throughout the remainder of the specification and in the appended claims, I shall use the term "ore" to cover and include all iron sulphide-bearing ores, concentrates and other mineral and metallurgical products which are amenable to treatment by the method of the invention. Throughout the specification and claims the term "ferra" is used to describe free or uncombined ferrous oxide (FeO).

This application is a continuation in part of my application, Serial No. 505,250, filed December 29, 1930 (Patent No. 1,976,735, dated October 16, 1934).

The method of the invention may be employed advantageously for the treatment of both simple and complex ores. Thus, for example, the method of the invention may be employed advantageously for the treatment of ores consisting substantially entirely of iron sulphide, ores consisting largely or iron sulphide and earthy constituents or gangue materials, or ores containing iron sulphide and one or more sulphides or other compounds of other metals such, for example, as copper, gold, silver, zinc, lead, cadmium, selenium, arsenic, antimony, thallium, germanium, cobalt, nickel and tin together with greater or lesser amounts of earthy constituents or gangue materials such as quartz and silicates.

For the treatment of ore consisting substantially entirely of iron sulphide or consisting largely of iron sulphide together with small amounts of earthy or gangue constituents, the invention contemplates an intensive oxidizing treatment by means of which the iron and other constituents of the ore may be obtained in forms suitable for the recovery of valuable products therefrom.

For the treatment of complex ores, the invention contemplates a series of alternate oxidizing and reducing operations in the course of which the metals and metalloids in the ore are selectively isolated and recovered substantially in their entirety as valuable commercial products. The oxidizing and reducing operations may be considered as in the nature of alternate titrations with oxygen and reducing agent, preferably with such over-oxidation and over-reduction as to insure completeness in the characteristic reactions of each operation. The invention thus involves a pyrometallurgical treatment of a mixed or complex sulphide ore in which the successive oxidizing and reducing operations are selective separating or concentrating steps in each of which a practically complete stage of dissection is attained.

In carrying out a process of the invention for the treatment of complex ores, the various operations involved therein may be controlled to insure the production of metallic iron products containing desirable amounts of non-volatile elements such as copper and nickel. Thus, for example, the production of a metallic iron product containing copper may be accomplished (1) by selecting for treatment ore containing iron and copper in the desired proportions, carrying out the intensive oxidation until an iron oxide-bearing product in which the copper is present in the metallic or oxide form is produced, and subjecting the resulting product to a reducing treatment until a product in which the iron and copper are present in metallic forms is produced; or (2) by subjecting to intensive oxidation ore in which the ratio of copper to iron is greater than that desired in the final metallic iron product, subjecting the product of the oxidation treatment to a selective reduction treatment to eliminate the excess copper and form an iron oxide-bearing product which may be reduced to form a metallic iron product containing copper in the desired proportion.

Alloying elements such, for example, as copper and nickel may also be incorporated in metallic iron products formed in accordance with the method of the invention by adding the elements or suitable compounds of the elements to the charge undergoing treatment at any suitable time prior to complete conversion of the iron of the charge to metallic iron or by adding the elements or suitable compounds of the elements to the metallic iron product while molten.

The invention, in some of its various aspects, is based on the fact that substantially complete elimination of sulphur contained in a charge comprising iron sulphide can be accomplished by intensive oxidation of the charge with the production of a product in which the iron is present largely in the form of magnetite and the fact that ferra (ferrous oxide, FeO) and magnetite ($Fe_3O_4$) can be maintained liquid without the fluxing assistance of silica at temperatures obtainable by the intensive oxidation of iron sulphide. With sufficiently intensive oxidation, the molten bath so produced will include (by liquation, solution, chemical combination or otherwise) all of the constituents of the ore, whether oxidized or not, which are not volatilizable under the conditions of the oxidizing treatment. Since the intensity of the oxidation is dependent to some extent upon the amount of oxidizable constituents in the ore, an ore to be amenable to the contemplated treatment must contain (naturally or admixed therewith) adequate oxidizable constituents (such as metallic sulphides) for the practical attainment of the desired intensive oxidation.

Based on these principles, the invention, in one of its aspects, contemplates the intensive oxidation of a mixed or complex sulphide ore containing iron with the production of (1) a gaseous product containing the bulk of the sulphur and such part of the other volatilizable constituents of the ore as volatilize during the oxidizing treatment, and (2) a molten product containing iron oxide or oxides and the other non-volatile constituents of the resulting oxidized ore. It is characteristic of this phase of the invention that the ore charge undergoing intensive oxidation contains such an amount of natural fuel, such as iron sulphide, as to insure fusion of the resulting oxidized ore without the fluxing assistance of silica at the temperature attained. While the ore may and usually will contain some silica, the amount of silica present is usually and preferably considerably less than required to form an iron silicate slag with all the iron present. In other words, ferra (ferrous oxide) or magnetite or ferra and magnetite are depended upon to impart the desired fluidity to the oxidized ore, and silica is not present or included in the charge for the purpose of forming a slag with such iron oxides, as is customary in the ordinary practices of pyritic smelting. The intensive oxidation is preferably carried to the stage of considerable over-oxidation, that is, until considerable iron has been oxidized to magnetite. The oxidation of FeO to $Fe_3O_4$ is highly exothermic and permits the attainment of relatively higher temperatures, thereby promoting the elimination (with subsequent recovery) of volatilizable constituents (such as sulphur, zinc, lead, cadmium, etc.). Since all of every volatilizable constituent of the ore can rarely be completely volatilized under the conditions prevailing during the intensive oxidation, only such part thereof is removed and included in the gaseous product as is volatile under the prevailing conditions, the remaining part being removed and recovered in succeeding operations.

The intensive oxidation of the ores may be carried out by passing an oxidizing gas, such as air, through or in contact with a charge of the ore heated to a sufficiently high temperature to effect ready burning or oxidation of the sulphides in the ore. The oxidation is of sufficient exothermic intensity to form a molten product of the resulting oxidized ore. In the course of this oxidizing treatment, the sulphur content of the ore is in large part burned or oxidized to sulphur dioxide (with perhaps a small amount of sulphur trioxide) and some part of the volatilizable constituents of the ore (such as zinc and lead) are volatilized; copper, if present, is, for the most part, converted optionally to copper sulphide, metallic copper, copper oxide, or mixtures thereof; and iron is converted to oxides thereof preferably with the formation of a considerable quantity of magnetic oxide of iron. The oxidizing treatment may be advantageously conducted by blowing an oxidizing gas through a molten bath resulting from a preceding operation or resulting from the oxidizing treatment itself, raw ore being added continuously or intermittently to the operation and melted by the heat of the oxidizing reactions until an appropriate amount of a molten oxidized ore has been formed. The oxidation is continued until substantially all of the sulphur (or alternatively substantially all of the sulphur not combined with copper) has been removed as elemental sulphur or sulphur oxides or as elemental sulphur and sulphur oxides with the gaseous product of the operation. The bulk of the copper will then be present in the molten oxidized ore as copper sulphide, metallic copper, or copper oxide depending upon the completeness of the oxidizing treatment, and the iron will preferably be present largely in the form of magnetite, with some ferra (ferrous oxide) or ferrous silicate slag depending upon the amount of silica naturally present in the ore.

Treatment of the ore for the removal of sulphur and the production of a molten product in which the iron is present largely in the form of magnetite may be carried out in one or several steps. Thus, for example, the ore to be treated may be treated directly and continuously by subjecting it to intensive oxidation in a suitable oxidation vessel until the iron contained therein has been oxidized to the desired degree; or the ore to be treated may be transferred after melting and partial oxidation to another vessel of the same general type and the oxidation continued until the iron contained therein has been oxidized to the desired degree, the first vessel serving as either a batch or continuous melting furnace and the transfer being preceded by or accompanied by or followed by the separation and removal of copper, if desired, as copper matte or white metal; or the ore to be treated may be first melted in a suitable melting furnace such as an ordinary matting furnace to effect gangue removal, to form a molten bath which may be subsequently subjected to intensive oxidation to effect the desired degree of oxidation of the iron or to accomplish both of these objects; or, as in the case of pyrites, the ore to be treated may be first subjected to a distillation treatment (at a temperature either above or below the melting point of the ore) to form a gaseous product containing the volatile sulphur of the pyrites in elemental form and to form either a solid product or a liquid or molten product in which the iron is present substantially in the form of the monosulphide and which may be subjected to intensive oxidation until the iron is oxidized to the desired extent.

The molten product of the oxidizing treatment may be subjected to the action of a reducing agent in one or several stages to produce metallic iron or metallic iron and one or more other products such, for example, as metallic copper and nickel or products from which metallic copper or nickel or copper and nickel may be obtained by subsequent treatments.

When the ore contains no substantial amount of a non-volatile element such as nickel or copper, the iron oxide product of the oxidizing treatment (in which the iron is present largely as magnetite) may be subjected while molten to the action of a reducing agent in any suitable manner until metallic iron is formed, or the molten product of the oxidizing treatment may be subjected to the action of a reducing agent until the magnetite contained therein has been reduced largely or entirely to ferra. The ferra-bearing product thus formed may be permitted to solidify in one or more masses and the solidified ferra-bearing product may be treated in any convenient manner for the production of metallic iron. Preferably, the ferra-bearing product is granulated by treatment with water and then subjected to the action of a reducing agent to produce metallic iron. The ferra-bearing product may be treated for the production of metallic iron in any suitable type of operation, as for example, in a blast furnace or open hearth operation, or in a sponge iron operation, or any other type of operation in which reduction of the ferra is carried out at a temperature either above or below the melting point of iron. Instead of reducing the magnetite of the molten product of the oxidizing treatment entirely or partially, the molten product may be granulated, either during or after solidification, and the resulting product may be treated for the production of metallic iron in any type of operation hereinbefore suggested for the treatment of ferra.

The procedures suggested for the treatment of ores containing no substantial amounts of nonvolatile metals may be carried out advantageously even when the ores contain substantial amounts of volatile metals such as zinc. In such cases, recovery of the sulphur and volatile metals may be accomplished by recovery and treatment of the gaseous products of the various operations.

If the molten product of the oxidizing treatment contains copper or nickel or copper and nickel but the amount of either or both present is equal to or less than the amount soluble in a quantity of ferra equivalent to the magnetite of the molten product or equal to or less than the amount which it is desirable to retain in the metallic iron product, the magnetite of the molten product is preferably reduced directly to metallic iron either with or without preliminary solidification or granulation.

When the ore is a complex ore containing, in addition to iron, a substantial amount of one or more nonvolatile elements such as copper and nickel all or a portion of which it is desirable to separate from the iron, the molten product of the oxidizing treatment is subjected to a differential or selective reduction treatment with the production of (1) a gaseous product containing a further part of the volatilizable constituents of the ore, (2) a molten copper product, and (3) a molten iron oxide product. If nickel, as well as copper is present in commercial quantities an intermediate selective reduction treatment may be carried out to produce (4) a nickel product which may be separated after or with the copper and from which nickel may be recovered by suitable treatment. The final end point of the fractional or selective reducing treatment is to reduce the iron content of the molten oxidized ore to the ferrous state, with the production of ferra and with, perhaps, some metallic iron. The copper content of the molten oxidized ore, if present as copper sulphide, may remain wholly or partly as such, but if present as copper or copper oxide will remain as or will be reduced to metallic copper, in the preferred practice. Any appropriate reducing agent may be employed in this selective reduction step. Thus, a reducing gas or an atomized reducing agent may be blown through the molten oxidized ore, and sufficient air, or other combustion-supporting gas, may be admitted above the molten mass to burn or oxidize such portion of the reducing gas or agent as passes unconsumed through the molten bath. A solid carbonaceous reducing agent, such as coke, may be added to the molten oxidized ore and appropriately mixed therewith, as for example, by blowing air or other appropriate gas through the molten mass and thereby agitating it. In any case, sufficient air, or other combustion-supporting gas, is admitted above the molten mass to complete the combustion of the reducing agent and assist in maintaining the temperature. As a result of this selective reducing treatment, when the ore contains a substantial amount of copper and little or no nickel, there is obtained an impure molten copper product, containing perhaps a small percentage of iron, and a molten iron oxide product consisting for the most part, of ferra (ferrous oxide) or ferra and ferrous silicate slag.

The molten copper product may advantageously be subjected to an oxidizing treatment, generally resembling the converter treatment of copper matte or the customary treatment of "black" copper. In the course of this oxidizing treatment, the copper, if not already present in the metallic state, is converted to metallic copper, and the iron is oxidized and may be converted to slag by the addition of appropriate slag-forming material. The metallic copper resulting from this treatment contains the gold and silver and may be cast and refined in the manner now customary in the industry. The slag produced is advantageously returned to the oxidizing treatment of the raw ore.

The iron oxide product resulting from the selective reducing treatment (consisting largely of ferra) may contain a small amount of copper dissolved therein. If further elimination of copper is desirable, the molten product of the selective reducing treatment may be subjected to a suitable treatment to effect its removal such as treatment with chlorine, or iron, or other agents. If more copper is desirable in the iron oxide product than the quantity dissolved therein, a fraction of the copper product may be retained. Thus means is provided to control the copper content so that, when the iron oxide product is to be used for the production of copper iron or copper steel, the copper content of the copper iron or copper steel will be within predetermined limits.

Copper removal may be effected by "washing" the copper-bearing ferra with molten metallic iron. Molten metallic iron, being a better solvent for copper than molten ferra, dissolves the copper from the ferra when admixed therewith. The resulting copper-rich metallic iron and the copper-impoverished ferra form separate layers upon standing and they may be separated by skimming or in any other suitable manner.

Molten metallic iron may be incorporated in the copper-bearing ferra in any suitable manner. Thus, for example, molten metallic iron may be formed in the bath of ferra by reducing a portion of the ferra, or metallic iron may be added to the molten ferra from an extraneous source.

Copper may be removed from molten ferra, also, by subjecting the molten ferra to the action of chlorine under oxidizing conditions. According to the preferred method of the invention, a mixture of air and chlorine is injected into the molten ferra. The chlorine reacts with the copper present, forming copper chloride which vaporizes. Small amounts of iron chloride are formed and vaporized, but when the amount of copper to be removed is relatively small, suitable elimination of copper can be accomplished before an appreciable amount of iron has been converted to chloride and vaporized.

The ferra produced in the selective reducing treatment provides a very desirable source of metallic iron, and the molten product containing the ferra may be treated in any suitable manner for the recovery of metallic iron. If facilities are such that all operations contemplated by the invention may be carried out simultaneously and conveniently, it is advisable to subject the ferra-bearing product to a reducing operation while molten in order to conserve its heat content. I have found, however, that with limited facilities it is advantageous to permit the molten ferra-bearing product to solidify and subsequently subject it to a reducing treatment.

I have also found that handling and subsequent treatment of the ferra-bearing product are considerably facilitated if the product is in granular form. Granulation of the product may be accomplished in any suitable manner. For example, the ferra-bearing product may be solidified in one or more relatively large masses and subsequently crushed or ground in any suitable manner to provide particles of suitable sizes, or the molten ferra-bearing product may be granulated by treatment with water. According to the preferred practice of the invention, the ferra-bearing material is granulated by treatment with water. This procedure provides particles of suitable sizes for a wide variety of reducing treatments for a minimum expenditure of time, money and energy.

The granulated ferra-bearing material may be subjected to a reducing treatment of any suitable type for the production of metallic iron. Thus, for example, the granulated ferra-bearing material may be subjected to a reducing treatment in a blast furnace operation, an open hearth operation, or in a sponge iron operation, or in any other type of operation for the reduction of iron oxide at a temperature either above or below the melting point of iron.

When treatment of the ferra-bearing product is carried out at a temperature above the melting point of iron, the reducing operation is conducted in the presence of appropriate slag-forming constituents, such as silica, which may be originally present in the raw ore, and lime, calcium fluoride, or the like, which may be originally present in the raw ore or may be added in the first oxidizing treatment, or may be added in either of the reducing treatments. As a result of this operation, there is obtained a gaseous product, a metallic iron product, which will usually contain a relatively small amount of copper, and a slag product which may advantageously be utilized in the manufacture of cement.

When treatment of the ferra-bearing product is carried out at a temperature below the melting point of iron, but sufficiently high to maintain a liquid slag, appropriate slag-forming materials are added and the metallic iron may be recovered from beneath the covering of liquid slag.

When treatment of the ferra-bearing product is carried out at a temperature below the melting point of the charge, as in the case of sponge iron production, the resulting solid metallic iron-bearing product may be melted to form molten metallic iron and slag which may be separated readily, or it may be crushed in any suitable manner, and the crushed product may be treated in any suitable manner to effect the separation of the metallic iron particles from which metallic iron may be recovered readily by melting.

Instead of carrying out the intensive oxidation treatment by blowing the oxidizing gas through a molten charge of the ore, I may subject the iron sulphide-bearing material in finely divided form to the action of the oxidizing gas while in suspension in the oxidizing gas. The oxidizing treatment may be controlled to effect complete oxidation of the iron sulphide-bearing material to the desired degree while the iron sulphide-bearing material is in suspension in the oxidizing gas, or the oxidation may be carried out partially in suspension and then completed in a molten bath. Any suitable type of suspension roasting or oxidizing operation may be employed. For example, the iron sulphide-bearing material in finely divided form (preferably minus 40-mesh) may be passed downwardly through a vertical tower through which an upwardly rising current of air is flowing, or a mixture of air and finely divided iron sulphide-bearing material, in suitable proportions for effecting oxidation of the iron sulphide to the desired degree may be blown into an oxidizing or combustion chamber maintained at a suitable temperature.

The suspension roasting or oxidizing operation may be carried out to produce either a molten oxidized product or a solid granular or sintered oxidized product. The physical state of the product of the oxidizing treatment will depend, to some extent at least, upon the character and composition of the material being treated and upon the temperature and other conditions within the oxidizing chamber. For example, in the treatment of pyrites, a granular or slightly sintered solid product may be formed readily by maintaining within the oxidizing chamber a temperature somewhat below the melting point of magnetite. When the ore contains fluxing agents or elements (such as copper and nickel) which as a result of the oxidizing treatment form relatively low-melting point compounds fusion of the oxidation product may be prevented or inhibited by suitably controlling the introduction of the iron sulphide-bearing material and the oxidizing gas. For example, the iron sulphide-bearing material may be introduced into the upper portion of a high oxidizing tower into the lower portion of which a relatively low-temperature oxidizing gas is introduced, and the oxidizing reactions may be so localized in the upper portion of the tower that the relatively cool oxidizing gas introduced into the lower portion of the oxidizing chamber functions to cool the oxidized ore particles passing downwardly therethrough to temperatures below their fusion points.

When the character of the material being treated is such that oxidation to the desired degree in suspension can not be carried out without producing a molten oxidized product, the suspension oxidizing treatment may be controlled to achieve either complete oxidation or partial oxidation in suspension.

When the suspension oxidizing treatment is employed to effect only partial oxidation, the oxidation is preferably completed by blowing an oxidizing gas through a molten bath to which the partially oxidized material is added. The resulting product may be treated for the recovery of desirable products in accordance with any suitable procedure hereinbefore set forth.

Solid, substantially solid or molten products formed by controlling suspension oxidizing operations to effect complete oxidation in suspension may be treated for the recovery of desirable products in accordance with procedures outlined herein for treatment of granular or molten products produced by blowing oxidizing gases through molten baths of ore or molten baths to which ore is added.

A preferred process and several alternative processes in accordance with the invention are outlined diagrammatically in the accompanying flow-sheet. In carrying out this preferred process, the raw run-of-mine sulphide ore is first appropriately crushed, say to pass through a one-inch mesh screen. It is advantageous to separate the dust from the crushed ore in order to facilitate feeding of the crushed ore into the oxidizing furnace and in order to avoid dusting nuisance. The dust is thus separately fed into an oxidizing furnace through any appropriate non-dusting type of feeder, and the substantially dust-free crushed ore is separately fed into the furnace through an appropriate type of feeder therefor.

The furnace employed is preferably of the tilting type, similar in general construction to an ordinary copper converter, provided with tuyères for the introduction of an oxidizing gas so disposed that they may be positioned below the level of the bath during the oxidizing treatment and moved to a position above the level of the bath upon completion of the oxidizing treatment.

The appropriately crushed ore is fed into the furnace in which the oxidizing treatment can be conveniently carried out. A small amount of the final molten charge of the preceding operation may be retained in the furnace, and the furnace is highly heated as a result of the preceding operation. The furnace is positioned so that its tuyères are covered to a sufficient depth with the molten mass within the furnace, and the oxidizing gas, such, for example, as preheated air, is blown through the tuyères into the furnace, say at a pressure of 10 to 20 pounds. At the same time, the crushed ore is fed into the furnace at approximately the rate at which the heat developed within the furnace will fuse or melt the oxidized ore. While oxidizing gas at ordinary atmospheric temperature may be introduced into the furnace, I prefer to preheat this gas, say to a temperature of 500° F. to 1000° F., since I find that the operation proceeds more smoothly with preheated gas. I also prefer to introduce into this furnace, along with the crushed ore, such amount of slag-forming material (such as lime, fluorspar, and the like) as may be required in subsequent operations, the idea being to utilize the excess heat of the oxidizing treatment to melt the slag-forming material.

As the oxidation treatment proceeds, the oxidized ore and slag-forming material melt, and the sulphur and other volatile constituents which may be present pass off from the furnace in the gaseous product. The operation is continued until practically all of the sulphur has been removed, at which time the entire charge will be molten with a large part of the iron in the form of magnetite. The copper will be in the form of copper oxide if the degree of oxidation has been carried far enough for the maximum removal of sulphur. Otherwise, some or even all of the copper may be present as sulphide or as metallic copper.

To attain the greatest nicety in the elimination of sulphur and avoid sulphur contamination of the magnetite product by "tramp" pieces of ore and the like, it is preferred to subdivide the oxidation treatment, using one or more vessels; the first vessel serving as either a batch or continuous melting furnace from which the molten ore is transferred after melting and partial oxidation to a second vessel wherein the oxidation may be continued to the desired degree free from the environment of any further additions of raw ore.

The tilting furnace is now turned so that the tuyères are above the level of the molten oxidized ore. An appropriate amount of coke, or other suitable reducing agent, is introduced into the furnace and mixes with the molten mass. Natural gas is a preferred reducing agent where available. The furnace may, if desired, be provided with auxiliary tuyères extending through the furnace wall, and preheated air or other appropriate gas may be blown through these tuyères in sufficient volume to agitate the molten mass and thereby mix the coke therewith. When natural gas is used, it is blown through similar tuyères. Air or other suitable gas is introduced through the tuyères above the molten mass for burning the combustible gases resulting from the reducing reactions between the coke and metallic oxides; the volume of this oxidizing gas being so proportioned that a neutral or slightly reducing atmosphere is maintained above the molten mass.

While it may be convenient and sometimes advantageous to carry out the selective reduction treatment in the same apparatus as the preceding intensive oxidation treatment, this is not necessary or preferred. The molten oxidized ore resulting from the oxidation treatment may preferably be transferred to another furnace designed particularly for the practice of the selective reduction treatment.

The reducing treatment effects the reduction of copper oxide to metallic copper and of magnetite to ferra (ferrous oxide) with perhaps some small reduction of the latter to metallic iron. Any metallic iron formed, and any copper sulphide present, will mix with the metallic copper. Where the melted oxidized ore, resulting from the intensive oxidation treatment, contains substantially all of the copper in the form of sulphide, the reducing operation is preferably conducted so as to form a certain amount of metallic iron which will combine with the copper sulphide to form a matte-like product. In any case, the reducing treatment produces a copper product which may consist for the most part of matte, or may be of any intermediate composition. The reducing treatment also removes by volatilization substantially all of the zinc or other volatile component not volatilized in the preceding oxidizing treatment. The bulk of the iron goes to form ferra. The viscosity and melting point of the ferra-bearing product may be appropriately lowered, as for example, by the addition of such fluxes as fluorspar. Due to their different specific gravities, the molten copper product and the molten ferra product may be separated by pouring the charge through a skimming door, or by tapping through holes of different elevations.

The molten copper product of the reducing operation may be conveniently further treated in an ordinary copper converter. If the product is relatively low in iron no flux is necessary. On the other hand, suitable fluxing material, such as siliceous matter, may be added to the converter, if desired or necessary. The converter is blown in the usual manner, until all of the iron has been converted into molten oxides or slags thereof, and the copper is in the form of metallic copper containing substantially all of the gold and silver present in the ore with traces of other elements. The converter is poured in the usual manner, the metallic copper being cast into slabs and the slag being returned to the tilting furnace in which the raw ore is initially treated.

The molten ferra-bearing product resulting from the selective reducing operation in the tilting furnace may be conducted to an iron reduction furnace while molten which may advantageously be of the same general type as the tilting furnace employed for the oxidizing treatment. The furnace (still hot from a preceding operation) is positioned so that the charge of molten slag submerges the tuyères, and a reducing gas, preferably preheated to as high a temperature as practicable, is blown through the tuyères into the furnace. Provision is made for the introduction into the furnace, above the level of the molten charge therein, of air or other oxidizing gas, preferably preheated to a temperature of 1200° F. in sufficient amount to partially combine with the reducing gas that passes unconsumed through the molten charge. The combustion of the reducing gas above the molten charge is regulated to provide an atmosphere non-oxidizing to the molten bath above the charge, and the heat of combustion is utilized in maintaining the desired high temperature within the furnace. The reducing furnace is also preferably provided with fuel burners as a supplementary source of heat, the iron is reduced to the metallic state, and will contain substantially all of the copper dissolved in the slag undergoing treatment. Thus, the iron may contain from 0.1 to 2.5% copper, and will be relatively low in carbon, usually less than 0.1%.

It is economically advantageous to use natural gas or reformed natural gas as the reducing agent in the iron reduction operation. Such a natural gas will consist for the most part of hydrocarbons, principally methane, but when reformed, principally hydrogen carbon monoxide and nitrogen. Other gaseous reducing agents are, of course, available for the purpose. While I now prefer to employ a gaseous reducing agent, solid or liquid carbonaceous or equivalent reducing agents may be utilized, preferably in finely divided or atomized form so that they may be blown into the molten mass in the furnace.

The slag from the iron reduction furnace is a calcium alumino silicate and may be economically worked up into Portland cement. The gaseous product of the iron reduction furnace will consist for the most part of nitrogen, carbon dioxide, carbon monoxide, hydrogen, water vapor and such volatile metallic constituents (zinc, etc.) as have escaped volatilization in the preceding treatments. The heat of this gaseous product is conserved in waste heat boilers, or the like, and in heat interchange apparatus for heating the reducing gas and air supplied to the furnace.

Instead of subjecting the molten ferra-bearing product to a reducing operation, I may first granulate it in any suitable manner and subsequently subject the granulated product to a reducing treatment in an operation similar to that described for direct reduction of the molten product or in any other suitable type of operation in which reduction of the ferra is carried out either at a temperature above the melting point of iron or at a temperature below the melting point of iron.

According to a preferred method of the invention, the molten ferra-bearing product resulting from the selective reduction treatment is subjected to the action of water to produce a granular product for subsequent treatment at any desired location and in suitable manner to produce metallic iron. Water at any temperature below its boiling point may be used for the granulating treatment. The resulting granulated product is a very desirable source of iron which may be treated according to any known method for the recovery of metallic iron therefrom.

The gaseous products of the intensive oxidation and selective reducing operations may be, and preferably are, conducted from the furnace or furnaces to waste heat boilers, where a portion of their heat energy is utilized to generate steam. Sufficient heat is retained in the gases exiting from these boilers to preheat the air, or other oxidizing gas, used in the furnace operations, say to a temperature of approximately 1000° F. The gases, now relatively cool, are next passed through a baghouse or other dust and fume-collecting apparatus. The fume product collected is appropriately treated for the recovery of valuable metallic constituents which it may contain, principally zinc, lead, cadmium and selenium. The gas exiting from the fume-collecting apparatus consists for the most part of nitrogen and sulphur dioxide. The sulphur dioxide may be concentrated, and the concentrated sulphur dioxide may be appropriately treated, preferably for the recovery of sulphur in elemental form. The concentration of the sulphur dioxide gas is not necessary, since the gas exiting from the fume-collecting apparatus may be directly subjected to appropriate treatment for the recovery of its sulphur content as elemental sulphur, or as sulphuric acid, or as any other marketable sulphur product.

As a specific example of the practice of the invention, in one of its complete aspects, I will take the run-of-mine ore from the United Verde Copper Co. mine in Arizona. The following may be taken as representative analyses of the ore:—

*Metallurgical analysis of ore*

| Ounces Au | Ounces Ag | Percent Cu | Percent Zn | Percent $SiO_2$ | Percent $Al_2O_3$ | Percent Fe | Percent CaO | Percent S |
|---|---|---|---|---|---|---|---|---|
| 0.03 | 1.35 | 2.0 | 6.0 | 10.1 | .13 | 35.2 | 0.6 | 42.0 |

*Mineralogical analysis of ore*

| Percent $CuFeS_2$ | Percent ZnS | Percent $FeS_2$ | Percent schist | Percent quartz | Percent $CaCO_3$ |
|---|---|---|---|---|---|
| 5.8 | 9.0 | 69.4 | 5.2 | 8.7 | 0.7 |

Assuming the treatment of 3000 tons of such an ore per day and reduction of the ferra-bearing material in an operation in which the ferra is reduced at a temperature above the melting point of iron, there is introduced along with that ore into the tilting furnace about 290 tons of lime (CaO). This amount of lime may be obtained from the calcination in ordinary lime kilns of about 560 tons of lime rock ($CaCO_3$). The lime rock might be directly added to the oxidizing furnace, although this presents certain disadvantages on account of the evolution of large volumes of carbon dioxide gas and the inclusion of such gas in the gaseous product of the tilting furnace. The oxidizing air blast is preheated to a temperature of 500° F. to 1000° F. and introduced into the furnace under a pressure sufficient to deliver the required volume against the resistance encountered.

When the oxidizing treatment is completed, about 60 tons of coke, or other appropriate reducing agent, are added for the selective reducing operation. Since the gaseous product of the oxidizing treatment will contain (principally as $SO_2$) substantially all of the sulphur in the ore, whereas the gaseous product of the selective reducing operation will contain practically no sulphur dioxide, it may be desirable in some cases to subject the two gaseous products to somewhat different subsequent treatments.

The final products of the selective reduction treatment are approximately 65 tons of a molten impure copper product and 2050 tons of ferra-bearing material analyzing approximately 0.5% Cu, 15.4% $SiO_2$, 2.0% $Al_2O_3$, 63.4% FeO, 15.0% CaO, and minor percentages of elements such as zinc and sulphur. The conversion of the impure copper product results in the production of about 50 tons of metallic copper product containing about 4050 ounces of silver and about 90 ounces of gold.

Reduction of the ferra-bearing material results in the production of approximately 1000 tons of metallic iron, containing about 1.25% copper, and about 670 tons of calcium alumino ferro-silicate slag. This slag appropriately treated in a cement plant with about 1000 tons of lime rock will produce approximately 6000 barrels (380 pounds per barrel) of Portland cement. The temperature of the gaseous product of the iron reducing furnace will be approximately 2700° F. and its heat energy is sufficient to produce 2,800,000 pounds of high pressure steam in waste heat boilers and to raise the temperature of the gaseous reducing agent and the air to a temperature of about 1200° F.

Roughly, some 200,000,000 cubic feet of air are blown into the tilting furnace in treating the 3000 tons of ore. Approximately the same volume of gaseous product is delivered from the furnace, at a temperature of about 2200 to 2700° F. The heat of this gaseous product will produce about 4,500,000 pounds of high pressure steam and will preheat all of the air blown into the tilting furnace to a temperature of 1000° F. The fume product collected is of relatively high grade and can be very economically treated for the selective separation and recovery of its various metallic constituents. The gas exiting from the fume collecting apparatus contains approximately 14% sulphur dioxide.

While it is now my preferred practice to leave a part of the molten product of the oxidizing or selective reduction treatments in the furnace as a nucleus or starting bath for the following oxidizing treatment, the furnace may, if desired, be entirely emptied and a starting bath obtained from the ore itself by any of several available methods. To this end an appropriate amount of ore is introduced into the furnace and heated by means of suitable burners above the charge, sufficient combustion fuel for beginning operations being supplied to these burners. The ore will be melted or liquated as in an ordinary reverberatory furnace, and when a sufficient quantity of molten bath has been formed the oxidizing treatment will be conducted as hereinbefore described.

The invention is applicable to the treatment of a wide variety of sulphide ores. The specific examples hereinbefore described are to be understood as illustrative of the invention and in no sense restrictive of its scope or application. Since, according to a preferred form of the invention, it is characteristic of the intensive oxidizing treatment that the non-volatile constituents of the resulting oxidized ore be melted, it may be necessary in treating some ores, whose earthy or gangue constituents are highly heat-resistant, to add with the ore appropriate fluxes, such as lime, silica, fluorspar and the like, in order to insure melting of the oxidized ore at the temperatures attainable in the operation. In some ores, the ratio of earthy or gangue constituents to sulphides may be so high as to render the ore deficient in fuel value for the desired autogenous operation of intensive oxidation. Such ores may advantageously be subjected to a preliminary concentration for the removal of an appropriate amount of the earthy or gangue constituents, or may be blended or mixed with other ore in which the ratio of gangue to sulphides is relatively low. A deficiency of the ore in fuel value may also be corrected by the use of extraneous fuel, such as coke, oil or gas, during the intensive oxidation.

The reducing furnace for the treatment of the ferra-bearing material may be heated exclusively by fuel, such as the combustion of hydrocarbon gas as hereinbefore described, or may be heated partially or wholly by electric energy. It may be desirable to use some electric heating in the operation of this furnace, as for example, by the medium of graphite electrodes dipping into or arcing to the molten bath. The utilization of electric heating reduces the volume of gaseous product obtained from the operation, and also enables the attainment of higher temperatures, thereby permitting the formation and fusion of more basic slags, such as di-calcic silicate slag instead of calcium mono-silicate slag. The di-calcic silicate slag more nearly resembles in composition the tri-calcic silicate of cement and furthermore decrepitates on cooling, both of which features are of advantage in a subsequent cement-making operation.

I claim:

1. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, treating the iron oxide product to produce a solid granular product, and subjecting the granular product to a reducing treatment to produce metallic iron.

2. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, treating the iron oxide product to produce a solid granular product, and subjecting the granular product to a reducing treatment at a temperature below the melting point of iron to produce metallic iron.

3. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, treating the iron oxide product to produce a solid granular product, and subjecting the granular product to a reducing treatment at a temperature above the melting point of iron to produce metallic iron.

4. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granular product to a reducing treatment to produce metallic iron.

5. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granular product to a reducing treatment at a temperature below the melting point of iron to produce metallic iron.

6. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granular product to a reducing treatment at a temperature above the melting point of iron to produce metallic iron.

7. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, granulating the magnetite-bearing product, and subjecting the granulated product to a reducing operation at a temperature above the melting point of iron to produce metallic iron.

8. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, granulating the magnetite-bearing product, and subjecting the granulated product to a reducing operation at a temperature below the melting point of iron to produce metallic iron.

9. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, granulating the magnetite-bearing product, and subjecting the granulated product to a reducing operation at a temperature below the melting point of iron to produce sponge iron.

10. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granulated product to a reducing operation at a temperature above the melting point of iron to produce metallic iron.

11. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granulated product to a reducing operation at a temperature below the melting point of iron to produce metallic iron.

12. The method of producing metallic iron which comprises subjecting a charge containing iron sulphide to intensive oxidation to form a molten iron oxide product in which a large proportion of the iron is present in the form of magnetite, thereby to effect substantially complete removal of the sulphur, subjecting the iron oxide product to a reducing treatment to reduce the magnetite contained therein to ferra, granulating the resulting ferra-bearing product, and subjecting the granulated product to a reducing operation at a temperature below the melting point of iron to produce sponge iron.

13. The method of recovering iron from ore containing iron sulphide which comprises melting the ore, subjecting the resulting molten product to intensive oxidation to form a molten iron oxide product in which a large proportion of the iron is present in the form of magnetite, treating the iron oxide product to produce a solid granular product, and subjecting the granular product to a reducing treatment to produce metallic iron.

14. The method of treating ore containing sulphides of iron, copper, and nickel which comprises subjecting the ore to intensive oxidation to form a molten iron oxide product in which the iron is present largely in the form of magnetite, and selectively reducing the iron oxide product to form separable copper, nickel and iron products.

15. The method of treating ore containing sulphides of iron, copper, and nickel which comprises subjecting the ore to intensive oxidation to form a molten iron oxide product in which the iron is present largely in the form of magnetite, selectively reducing the iron oxide product to form separable copper and nickel products and an iron oxide product consisting largely of ferra, granulating the ferra-bearing product, and subjecting the granulated product to a reducing treatment to produce metallic iron.

16. The method of treating a mixed sulphide ore containing iron and copper which comprises subjecting the ore to an intensive oxidation and thereby removing in the resulting gaseous product the bulk of the sulphur originally present in the ore and forming a molten product of the resulting oxidized ore, subjecting said molten product to a selective reduction treatment in the course of which an iron oxide product and copper product are formed, granulating the iron oxide product, and subjecting the granulated product to a reducing treatment to produce metallic iron.

17. The method of treating ore containing sulphides of copper and iron which comprises subjecting the ore to intensive oxidation to form a molten bath in which the iron is present largely in the form of magnetite, subjecting the magnetite-bearing product to a selective reduction treatment for the production of separable copper and iron oxide products, treating the iron oxide product to effect the removal of copper dissolved therein, and subsequently subjecting the iron oxide product to a reducing treatment to produce metallic iron.

18. The method of treating ore containing sulphides of iron and nickel which comprises subjecting the ore to intensive oxidation to form an iron oxide product in which the iron is present largely in the form of magnetite, and selectively reducing the iron oxide product to form separable nickel and iron products.

19. The method of producing a metallic iron product containing an alloying element which comprises subjecting ore containing iron sulphide to intensive oxidation to produce an iron oxide product in which the iron is present largely in the form of magnetite, treating the iron oxide product to produce a metallic iron product, and adding one or more alloying elements to the charge prior to the production of the metallic iron product.

20. The method of producing pure metal, which comprises melting an ore of the metal, purifying the ore by a blast of gas blown through it, while keeping it in a molten condition, changing the molten purified ore to a solid granular condition, and chemically reducing the purified solid ore to sponge metal.

21. The method of treating material containing sulphide of iron and copper which comprises subjecting the material to intensive oxidation to eliminate sulphur and form an iron oxide product in which the iron is present largely in the form of magnetite, subjecting the resulting magnetite-bearing product to a reducing treatment to convert magnetite contained therein to ferrous oxide, treating the ferrous oxide-bearing product to effect the separation of copper dissolved therein, and treating the residual iron-bearing product to form a metallic iron product.

22. The method of treating material containing sulphide of iron and copper which comprises subjecting the material in finely divided form to intensive oxidation while in suspension in an oxidizing gas to eliminate sulphur and produce an iron oxide product containing magnetite, subjecting the resulting magnetite-bearing product to a reducing treatment to convert magnetite contained therein to ferrous oxide, treating the ferrous oxide-bearing product to effect the separation of copper dissolved therein, and treating the residual iron-bearing product to form a metallic iron product.

23. The method of treating material containing sulphide of iron and copper which comprises subjecting the material in finely divided form to intensive oxidation while in suspension in an oxidizing gas to eliminate sulphur and produce an iron oxide product containing magnetite, subjecting the resulting magnetite-bearing product to a reducing treatment to convert magnetite contained therein to ferrous oxide, treating the ferrous oxide-bearing product to effect the separation of copper dissolved therein, and treating the residual iron-bearing product to form a sponge iron product.

24. The method of treating a mixed sulphide ore containing iron and copper which comprises subjecting the ore to an intensive oxidation and thereby removing in the resulting gaseous product the bulk of the sulphur originally present in the ore and forming a molten product of the resulting oxidized ore, subjecting said molten product to a selective reduction treatment in the course of which an iron oxide product and copper product are formed, granulating the iron oxide product, and subjecting the granulated product to a reducing treatment at a temperature below the melting point of iron to produce a sponge iron product.

25. The method of treating a mixed sulphide ore containing iron and copper which comprises subjecting the ore to an intensive oxidation and thereby removing in the resulting gaseous product the bulk of the sulphur originally present in the ore and forming a molten product of the resulting oxidized ore in which a large part of the iron is present in the form of magnetite, subjecting said molten product to a selective reduction treatment with the production of a molten copper product and a molten iron oxide product containing insufficient silica to form an iron silicate slag with the iron oxide thereof, subjecting said molten copper product to a converting operation with the production of blister copper, granulating said iron oxide product, and subjecting the granulated product to a reducing operation in the presence of appropriate slag-forming constituents and thereby obtaining a molten metallic iron product and a slag product.

26. The method of treating a mixed sulphide ore containing iron and copper which comprises subjecting the ore to an intensive oxidation and thereby removing in the resulting gaseous product the bulk of the sulphur originally present in the ore and forming a molten product of the resulting oxidized ore in which a large part of the iron is present in the form of magnetite, subjecting said molten product to a selective reduction treatment with the production of a molten copper product and a molten iron oxide product containing insufficient silica to form an iron silicate slag with the iron oxide thereof, subjecting said molten copper product to a converting operation with the production of blister copper, granulating said iron oxide product, and subjecting the granulated product to a reducing operation at a temperature below the melting point of iron to produce a sponge iron product.

27. The method of treating a mixed sulphide ore containing iron and zinc which comprises subjecting the ore to an intensive oxidation and thereby removing in the resulting gaseous product the bulk of the sulphur and some of the zinc originally present in the ore and forming a molten product of the resulting oxidized ore in which a large part of the iron is present in the form of magnetite, subjecting said molten product to a selective reduction treatment in the course of which there is produced (1) a gaseous product containing a further part of the zinc originally present in the ore and (2) a molten iron oxide product containing insufficient silica to form an iron silicate slag with the iron oxide content thereof, granulating said iron oxide product, and subjecting said granulated product to a reduction treatment to produce metallic iron.

28. The method of treating a mixed sulphide ore containing iron and zinc which comprises subjecting the ore to an intensive oxidation and thereby removing in the resulting gaseous product the bulk of the sulphur and some of the zinc originally present in the ore and forming a molten product of the resulting oxidized ore in which a large part of the iron is present in the form of magnetite, subjecting said molten product to a selective reduction treatment in the course of which there is produced (1) a gaseous product containing a further part of the zinc originally present in the ore and (2) a molten iron oxide product containing insufficient silica to form an iron silicate slag with the iron oxide content thereof, granulating said iron oxide product, and subjecting the granulated product to a reducing treatment at a temperature below the melting point of iron to produce a sponge iron product.

29. The method of treating a mixed sulphide ore containing iron, copper and zinc which comprises subjecting the ore to intensive oxidation with the production of (1) a gaseous product containing the bulk of the sulphur and some of the zinc originally present in the ore and (2) a molten product containing the resulting oxidized ore, subjecting said molten product to a selective reduction treatment with the production of (1) a gaseous product containing a further part of the zinc originally present in the ore and (2) a molten copper product and (3) a molten iron oxide product, granulating said iron oxide product, and subjecting said granulated iron oxide product to a further reduction treatment with the production of (1) a molten metallic iron product and (2) a molten slag product.

30. The method of treating a mixed sulphide ore containing iron, copper and zinc which comprises subjecting the ore to intensive oxidation with the production of (1) a gaseous product containing the bulk of the sulphur and some of the zinc originally present in the ore and (2) a molten product containing the resulting oxidized ore, subjecting said molten product to a selective reduction treatment with the production of (1) a gaseous product containing a further part of the zinc originally present in the ore and (2) a molten copper product and (3) a molten iron oxide product, granulating said iron oxide product, and subjecting the granulated product to a reducing treatment at a temperature below the melting point of iron to produce a sponge iron product.

CHARLES R. KUZELL.